United States Patent [19]

Keim et al.

[11] Patent Number: 5,117,612
[45] Date of Patent: Jun. 2, 1992

[54] METHOD AND APPARATUS FOR CONTROLLING THE MOVEMENT OF CROSS-WELDING JAWS OF A TUBULAR BAGGING MACHINE

[75] Inventors: Dieter Keim, Langgöns; Bernd Stein, Reiskirchen; Walter Baur, Gründau; Werner Schneider, Hohenahr; Herbert Lohr, Reiskirchen; Rainer Ade, Bad Nauheim; Michael Kabot, Pohlheim, all of Fed. Rep. of Germany

[73] Assignee: Rovema Verpackungsmaschinen GmbH, Fernwald, Fed. Rep. of Germany

[21] Appl. No.: 421,468

[22] Filed: Oct. 13, 1989

[30] Foreign Application Priority Data

Oct. 18, 1988 [DE] Fed. Rep. of Germany ....... 3835461
Mar. 7, 1989 [DE] Fed. Rep. of Germany ....... 3907208

[51] Int. Cl.⁵ .............................................. B65B 51/30
[52] U.S. Cl. ................................... 53/451; 53/477; 53/551; 53/374.8
[58] Field of Search ............ 53/477, 451, 450, 551, 53/550, 373, 75, 76; 156/583.1

[56] References Cited

U.S. PATENT DOCUMENTS

| | | | |
|---|---|---|---|
| 3,055,154 | 9/1962 | Markley et al. | 53/182 |
| 3,070,931 | 1/1963 | Zwight | 53/182 |
| 3,438,173 | 4/1969 | Omori | 53/39 |
| 3,685,250 | 8/1972 | Henry et al. | 53/180 |
| 4,199,919 | 4/1980 | Moscatelli | 53/553 |
| 4,291,520 | 9/1981 | Prince et al. | 53/551 |
| 4,622,793 | 11/1986 | Oki | 53/551 X |
| 4,622,798 | 11/1986 | Oki | 53/551 X |
| 4,622,978 | 5/1987 | Oki | 53/477 X |
| 4,750,313 | 6/1988 | Kammler et al. | 53/451 |
| 4,751,808 | 6/1988 | Hadden | 53/451 |
| 4,757,668 | 7/1988 | Klinkel et al. | 53/451 |
| 4,768,327 | 9/1988 | Mosher | 53/551 X |
| 4,885,900 | 12/1989 | Lohr et al. | 53/551 |

Primary Examiner—James F. Coan
Attorney, Agent, or Firm—Flynn, Thiel, Boutell & Tanis

[57] ABSTRACT

In order to avoid in a tubular bagging machine the disadvantages resulting from the state of the art through a cam-plate control of cross-welding jaws, it is suggested according to the invention, that the control of the movement of the cross-welding jaws occurs in dependency on the contact pressure, the temperature and the needed sealing time, with the drive being able to occur mechanically by means of a toggle-lever drive mechanism.

31 Claims, 3 Drawing Sheets

METHOD AND APPARATUS FOR CONTROLLING THE MOVEMENT OF CROSS-WELDING JAWS OF A TUBULAR BAGGING MACHINE

FIELD OF THE INVENTION

The invention relates to a method for controlling the movement of cross-welding jaws of a tubular bagging machine and to a tubular bagging machine, which is suited in particular to carry out the method and includes a forming shoulder and a welding mechanism to construct a foil tube and cross-welding jaws arranged thereafter, which jaws are movable laterally with respect to the foil tube.

BACKGROUND OF THE INVENTION

Tubular bagging machines are known from the state of the art, for example from German Patent 35 38 723, in which the movement of the cross-welding jaws is controlled by means of cam plates. A cam-plate pair is thereby in particular provided, which is operatively connected directly with the pair of cross-welding jaws and is constructed such, that upon a complete rotation of the cam plate one operating cycle of the respective cross-welding jaw is carried out. Since the shape of each respective cam plate is fixed, it is not possible to adapt the movement of the cross-welding jaw to the respective operating conditions. It is in particular not possible to control the necessary sealing or welding times depending on the type of the material of the tubular bag or of the foil, the temperature of this material or the temperature of the welding jaws. It is furthermore not possible to adjust the respectively needed contact pressure of the cross-welding jaws to the requirements. All of this has the result under unfavorable operating conditions that either no sufficient welding or sealing occurs or that the material is heated up too much by the cross-welding jaws, and that holes or defects can be created.

A further disadvantage of the known cam-plate control of the cross-welding jaws is, that the cross-welding jaws often hit one another hard due to the acceleration caused by the cam plates, so that high material stress occurs. This has the result, that the cross-welding jaws must be manufactured of stronger materials and must be dimensioned accordingly. All of this increases the manufacturing expenses of the welding jaws and has the result, that greater masses must be moved.

A further disadvantage of the known design of a tubular bagging machine is, that an adjustment of the movement of the cross-welding jaws to the possible cycle time resulting from the material of the tubular bag is hardly possible. An increase in the peripheral speed or rather the rotational speed of the cam plates does result in a shortening or extending of the operating cycle, however, with the result, that at a suitable adjustment of the sealing or welding time, the times for the remaining operating steps are also extended or shortened, so that, for example, a satisfactory filling of the bag is not possible or is possible only at a considerable expense.

The basic purpose of the invention is to produce a method and an apparatus of the above-mentioned type, which with a simple design and operatively safe handling enable a simple adjustment to the respective operating conditions and avoid the disadvantages of the state of the art.

SUMMARY OF THE INVENTION

With respect to the method, the purpose is attained by the control taking place in dependency of the contact pressure, the temperature and the necessary sealing time.

The method of the invention is distinguished by a number of significant advantages. Since the movement of the cross-welding jaws can be controlled in dependency of method parameters measured during the process, it is possible to adjust the method to accommodate changing dimensions of the material of the tubular bag, for example, differing widths or thicknesses of the material. It is thereby in particular possible to preselect at an optimum, corresponding with the demands, the temperature existing in the contact area between the material of the tubular bag and the cross-welding jaws during the welding or sealing operation. Thus, it is for example prevented, that the tubular-bag material is cold-formed and possibly damaged in the seam area by the cross-welding jaws possibly causing leaks in the seam area. A further important advantage of the method of the invention is, that it is possible to adjust the contact pressure to the respective requirements and to optimize said contact pressure with respect to the respective tubular-bag materials to be used. In particular when using different material thicknesses or when the material thickness varies, it is thus possible to guarantee a safe and reliable performance of the method. Furthermore, it is possible through the control of the sequence of movement of the cross-welding jaws in dependency of the contact pressure to build up said contact pressure, starting out from a desired distance between the cross-welding jaws, to the optimum value. It is thereby prevented, that the jaws, as this is possible in the state of the art, are pressed against one another with too little or too much pressure.

According to the invention, it is furthermore particularly advantageous, that the necessary sealing time can be used to control the movement of the cross-welding jaws. Thus, it is, for example, possible to suitably consider temperature variations of the cross-welding jaws, which can result in a shortening or extending of the sealing time. It is furthermore possible to adjust the sealing time to different pressure relationships, that is, to reduce the sealing time, for example, in the case of a higher contact pressure of the cross-welding jaws. In addition there results the possibility to preheat the tubular-bag material, so that the sealing time needed all together can be shortened.

A preferred further development of the inventive method provides, that the temperature of the cross-welding jaws is determined and fed to a control mechanism. It can furthermore prove to be advantageous to also determine the temperature of the bag material in the area of the cross-welding jaws and to feed same to the control mechanism. In this manner it is possible according to the invention to compensate for temperature variations, for example, by changing the contact pressure or the sealing time. The temperature changes can result, for example with a uniform tubular-bag material, from the respectively necessary filling time of the tubular bag with the materials to be packaged. Thus it is particularly easily possible according to the invention to change the materials to be filled, without adjusting the control of the tubular bagging machine separately in each case.

In order to determine as simply as possible the respective contact pressure of the cross-welding jaws, it can be advantageous to determine the power input of a drive of the cross-welding jaws and to feed same to the control mechanism. Thus, additional pressure gauges or similar devices are not needed. This results in a significant simplification of the design of the tubular bagging machine and in a reduction of the expenses of the cross-welding jaws. Furthermore, this type of operation detects breakdowns, for example a bearing damage at a higher friction.

The path of movement of the cross-welding jaws can according to the invention be determined preferably from an angular variation of the drive mechanism of the cross-welding jaws and can be fed to the control mechanism. Additional path-measuring devices are thereby not needed.

An operating cycle includes in a particularly favorable embodiment of the invention a first operating step, during which the cross-welding jaws are separated from one another, a following second operating step, during which the cross-welding jaws are moved toward one another and are placed on the tubular bag to be welded, a subsequent third operating step, during which the cross-welding jaws are pressed against one another, and a fourth operating step, during which the cross-welding jaws are separated from one another. Thus, it is possible according to the invention to divide the operating cycle of the cross-welding jaws into individual operating steps, which can be controlled independently from one another. From this results among others the advantage, that a variable preheating time, a variable sealing and welding time and, if necessary, a variable reheating time can be provided. Furthermore, it is possible to vary the jaw speed as desired during all phases of movement of the operating cycle, so that, for example, an acceleration, a uniform movement, a deceleration and a standstill of the cross-welding jaws, adapted to the respective operating conditions, can be carried out.

A further advantage of the invention results from the stroke of the cross-welding jaws being able to be varied without changing any mechanical structural parts, as this is necessary in the state of the art.

A favorable further development of the invention provides, that during the second operating step cross-welding jaws are moved toward one another in dependency of the thickness of the material of the tubular bag. Thus, it is prevented, that in the case of a thicker tubular-bag material the cross-welding jaws squeeze and/or damage the material.

A particularly advantageous further development of the method of the invention is, that prior to or at the start of the second operating step the cross-welding jaws are kept at a distance from the surface of the tubular bag for heating up said tubular bag. Thus, it is possible to significantly shorten the actual welding or sealing time, since the material of the tubular bag is already in a preheated state. Also the foil material is more carefully welded together during the subsequent thermal deformation. Even when using welding materials with profiled sealing surfaces, tear formations in aluminum-bonded laminate foils are very unlikely. It is furthermore possible to keep the cross-welding jaws at a small distance from one another prior to the fourth operating step for the purpose of reheating. This reheating makes it possible to secure a uniform construction of the welding seam. In particular, faults or stresses in the welding seam can be prevented. The possibility to variably adjust the distance between the cross-welding jaws and the tubular-bag material during the preheating or reheating time enables an exact adjustment of the preheating or reheating to the respective requirements.

Furthermore, it can be advantageous to carry out the inventive method several times one after the other, so that a multiple welding or rather the construction of multiple welding or sealing seams, which are parallel to one another, is possible.

A cut with a knife to separate the tubular bags can follow the method of the invention as the next operating step.

The method of the invention results in a low mechanical load on both the cross-welding jaws and also on the material of the tubular bag, and it is possible to vary as desired all sequences of movement, that is, the entire operating cycle during the individual operating steps and to adjust same to the respective requirements. A further important advantage is, that it is possible to exactly control the pressure of the cross-welding jaws on the material of the tubular bag. Thus, it is possible to individually adjust both the pressure build-up and also the pressure drop. The position, which the cross-welding jaws have to assume during the preheating, that is, the distance between the tubular-bag material and the cross-welding jaws, can be determined in dependency on the thickness of the tubular-bag material or rather of the foil material and as a function of the pressure-build-up time.

The basic purpose of the invention with respect to a tubular bagging machine is attained by the cross-welding jaws being movable through a drive mechanism, which, controlled by a control mechanism, can be operated through a drive. Thus, the invention creates the possibility to move the cross-welding jaws depending on the respective operating parameters. An adjusting thereby does not demand an exchange of mechanical parts, as this is the case in the state of the art.

The drive mechanism can be constructed advantageously in the form of a toggle-lever arrangement. The moving of the toggle-lever arrangement can be done through a ball-roller spindle, reversibly movable cam plates, a hydraulic cylinder or a linear drive. Furthermore, it can be advantageous, when a sensor for determining the path of movement of the cross-welding jaws is arranged in the area of the toggle-lever arrangement.

A preferred embodiment of the invention provides, that the drive mechanism for each cross-welding jaw includes a cam plate, on which a cam connected to the cross-welding jaw is guided, and that the cam plates are constructed on a support plate, which is reversibly pivotal. It is particularly advantageous in this design of the tubular bagging machine, that only the support plate must be reversibly pivotal in order to produce a back and forth movement of the cross-welding jaws, while the main part of the drive, in particular the drive motor is independent from said movement. It is thereby possible to utilize a normal, rotating motor, which can be manufactured inexpensively and can be designed technically simply. If desired, however, it is also possible to pivot the support plate in reverse by means of a reversing motor. A further advantage of this type of design is that, in contrast to a pure toggle-lever mechanism, the cam plates, by means of which the movements of the cross-welding jaws are controlled, can be constructed such, that a true reversing becomes possible also at high cycle frequencies. Furthermore, this design is such, that the masses to be reversed can be significantly reduced in contrast to a pure toggle-lever arrangement. This results in a considerable technical simplification of the entire tubular bagging machine and permits to significantly shorten the cycle times while maintaining a high operating safety and a long life of the tubular bagging machine. A further advantage of this development is, that a drive motor does not need to stop, since the shape of the cam plates can be chosen such, that, while the motor is rotating, the cross-welding jaws stand still for carrying out the sealing operation. It is furthermore particularly favorable, that the closing of the cross-welding jaws, the sealing time and/or the sealing pressure can be regulated both mechanically by changing the drive mimic and also electrically by influencing the motor speed.

It is advantageous according to the invention to pivot the support plate by means of a crank gear, since it is then possible to use a simple, rotating drive motor. Said drive motor has preferably a crank disk operatively connected to said drive motor, which crank disk is connected to the support plate through a rod. The closing movement of the cross-welding jaws and the sealing time can be carried out particularly easily in this embodiment by either the connecting rod being constructed longitudinally adjustably or the drive motor being pivotally supported in order to shift the axis of rotation of the crank disk in this manner. The drive motor can be pivoted either manually or by means of a servo drive. It is furthermore possible to construct the drive motor to be speed-regulatable in order to adjust the closing movement or the sealing time. Since according to the invention the cam guided in the cam path and fixedly connected to the cross-welding jaw causes a back and forth movement of the cross-welding jaw in dependency of a pivoting of the support plate, it is thus possible to set the time for closing the sealing jaws (stroke) and the sealing time. These two times are divided depending on the initial position of the cams in the open position of the cross-welding jaws. The above-mentioned measures can be utilized either individually or in combination in order to carry out a suitable adjustment. In addition it is furthermore possible to predetermine the sealing time by influencing the shape of the cam plate. It is thereby possible to construct both cam plates point symmetrically in relationship to the swivel axis of the support plate, so that both cross-welding jaws are moved in the same manner. However, it is also possible to design the cam plates each differently to produce each a different movement of the cross-welding jaws, for example, by the cam plate of a first cross-welding jaw having a closing area and a sealing area not including a closing following thereafter, while the cam plate of the second cross-welding jaw includes a closing area, an area with little closing following thereafter and then a sealing area not including a closing. The second cross-welding jaw experiences in this embodiment an over-stroke in order to maintain the contact force during the sealing operation.

A further, particularly advantageous development of the invention provides, that an adjustable spring element is arranged at least between one of the cross-welding jaws and the associated drive mechanism, which spring element can be constructed like a spring mechanism (air spring) loadable with air pressure, a mechanical spring or also a hydraulic spring with a spring load. The spring element is constructed adjustably in order to produce a sufficient, constant contact force during the over stroke of one of the cross-welding jaws during the sealing or welding time. The spring force of the spring mechanism can be adjusted preferably independent of the operation of the drive mechanism of the cross-welding jaw.

The invention makes it possible to influence the sealing time itself by using the spring element and while maintaining all other operating factors. If, for example, an air spring is used acting against a mechanical spring, then a higher pressure is built up in the air piston during the sealing time. If said higher pressure is reduced at a specific point in time, the mechanical spring causes a moving back of the piston and thus a moving back of the cross-welding jaw. This has the result, that the two cross-welding jaws are arranged spaced from one another, so that the sealing seam can cool off, while same is not yet stressed by the fill material of the bag, which fill material can be supported on cooler areas of the cross-welding jaws.

It is furthermore possible by using a spring element operated with air to monitor the closing operation of the cross-welding jaws in such a manner, that the pressure in the air spring is monitored, for example, by means of a sensor. Should a pressure increase be noticed during the closing movement, then this indicates, that the cross-welding jaws, when moving toward one another, rest against fill material, which would prevent the construction of a leak-proof sealing seam. The monitoring of the pressure can thus be utilized for control purposes.

A further advantageous use of an air-spring element with adjustable pressure in the air piston is, that at a breakdown in the production of the bags, for example the feeding of fill material or the longitudinal welding of the foil strand, the cross-welding mechanism can continue to operate without multiple sealings to occur. This can be accomplished alone by reducing the spring tension through reduction of the air pressure in the air cylinder, so that the spring adjusts the associated jaw such, that same, in its end position, is not pressed against the oppositely lying cross-welding jaw. Thus, the construction of a cross-welding seam is prevented.

A further advantage for using cam plates to control the cross-welding jaws is, that during a reversing the cams in the cam plate or rather the crank disk carry out only a relatively small stroke at a relatively large angle of traverse, so that a very gentle sine course exists during the movement of the cross-welding jaws. In contrast to a pure toggle-lever arrangement, a sudden switching over, putting high stress on the apparatus, does not occur here, since the masses to be reversed are very small. The weight of the motor, of the gearing flanged to said motor and of the connecting rod has no effect on the reversing. It is furthermore possible to adapt the sealing time at an optimum through the already described measures or rather through an adjustment of the spring elements to the respective requirements.

The drive method and drive developments of the invention make it possible to produce a high force over a short path of the cross-welding jaws during the pressure build-up. It is furthermore advantageous according to the invention, that only few or rather small moved masses exist, so that a material-protecting welding or sealing is possible.

BRIEF DESCRIPTION OF THE DRAWINGS

The invention will be described hereinafter in connection with one exemplary embodiment and the drawings, in which.

DETAILED DESCRIPTION

Figure 1:
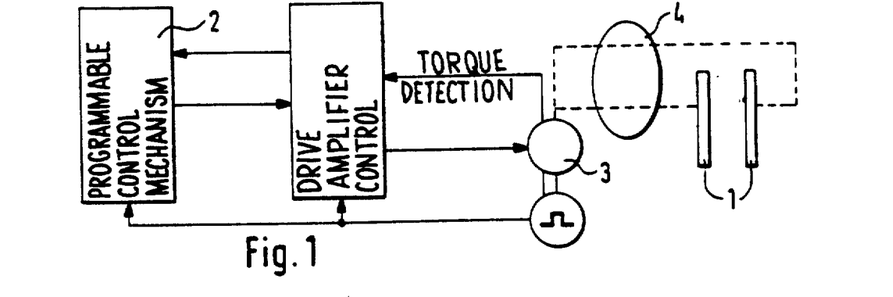
FIG. 1 schematically illustrates the inventively important structural parts of one exemplary embodiment of a tubular-bagging machine.

FIG. 1 shows a schematic arrangement of the invention tubular-bagging machine. Only the parts and building groups important for the operation of the invention are illustrated. Reference numeral 1 schematically illustrates a pair of cross-welding jaws. Said pair of cross-welding jaws are, as will be described hereinafter, movable relative to one another in order to be able to rest against a foil tube. A drive mechanism 4 exists in the area of the cross-welding jaws 1, which drive mechanism is only schematically illustrated in FIG. 1 and which can be driven by a drive 3 (motor). A sensor, not illustrated in detail, is provided on the drive 3, by means of which sensor it is possible to determine the torque of the drive or rather the power input of the drive 3 and two feed same to a drive amplifier and regulating system, which in turn are connected to a programmable control mechanism. Thus it is possible to operate the drive 3 depending on preselected operating parameters. The torque of the drive 3, which is directly proportional to the contact pressure of the cross-welding jaws, is provided as one of these parameters in the illustrated exemplary embodiment.

Figure 2:
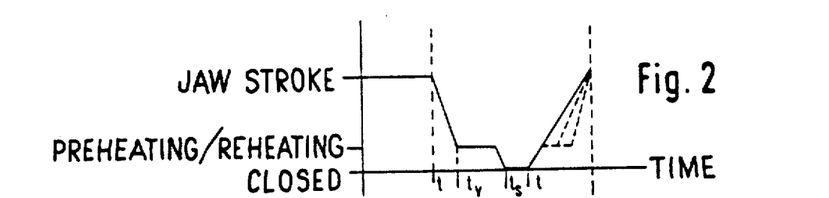
FIG. 2 shows a diagram illustrating the time sequence of one operating cycle of the cross-welding jaws.

FIG. 2 illustrates an operating cycle of the cross-welding jaws over time. The cross-welding jaws are open at the start of the cycle (first operating step), at which time it is possible to move a foil tube through between the cross-welding jaws. The cross-welding jaws are closed up to a specific distance during a second operating step, which is used to preheat the foil material to be welded or sealed. The cross-welding jaws are, after a holding time, pressed against one another during a fourth operating step in order to carry out in this manner the welding operation in the fifth step. It is then possible during a sixth operating step to now again completely separate the cross-welding jaws from one another, as illustrated in the full line in FIG. 2. However, it is also possible, as shown by the dashed lines in FIG. 2, to first move the cross-welding jaws apart to a distance corresponding with the preheating distance or another distance in order to carry out in this manner a reheating of the welding or sealing seam. It is subsequently possible to again separate the welding jaws from one another.

Figure 5:
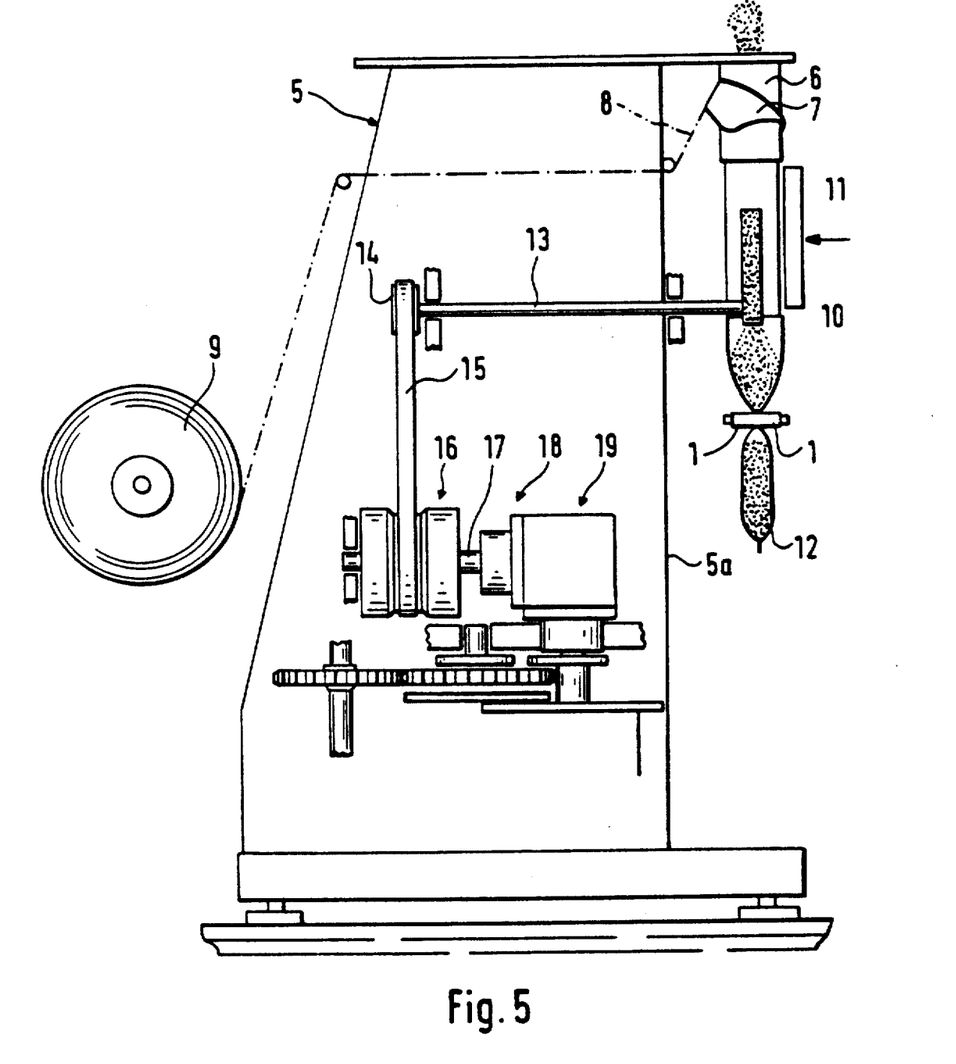
FIG. 5 is a schematic illustration of a tubular-bagging machine.

FIG. 5 shows a schematic side view of an inventive tubular bagging machine. In includes a frame 5 constructed as a housing and having a vertical fill pipe 6 at its front side 5a. The upper area of the fill pipe 6 is surrounded by a forming shoulder 7, oven which a cover-like strand 8 is placed. The strand (or sheet) 8 can be constructed in the form of a foil or a net and is pulled off from a roller 9 supported in the area of the housing 5. The cover-like strand 8 is pulled off by means of an endless belt 10 arranged in the area of the fill pipe 6 and having a high friction coefficient, so that the strand is moved along the fill pipe 6.

A longitudinal welding jaw 11 exists below the forming shoulder 7, which jaw 11 is used to weld together the edges of the cover-like strand to thus construct an endless tube.

Two cross-welding jaws 1 are arranged below the longitudinal welding jaw 11, which cross-welding jaws 1 are used to divide the cover-like strand through crosseams into individual bags 12.

The withdrawing belt 10 is driven through a shaft 13 connected to a belt pulley 14 over which a driving belt 15 runs, which in turn is guided through a coupling 16. Said coupling is connected through a shaft 17 to a gearing 18 and a miter gear 19 operatively connected to said gearing 18. The drive is handled by a drive 3 (motor) not illustrated in FIG. 5 through a transmission gear not illustrated in detail.

The fill pipe 6 makes it possible to fill the substances to be bagged into the foil tube, with the filling operation generally occurring not before the cross-welding jaws 1 rest on the foil tube and squeeze same off.

Figure 3:
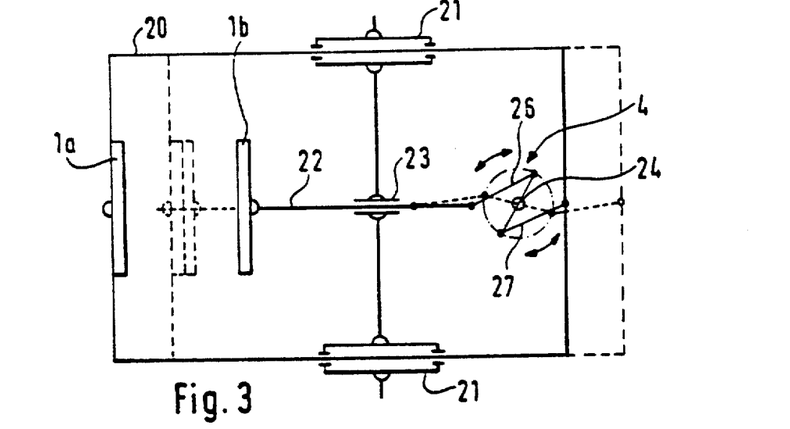
FIG. 3 is a simplified front view of the important parts for the operation of the cross-welding jaws.
Figure 4:
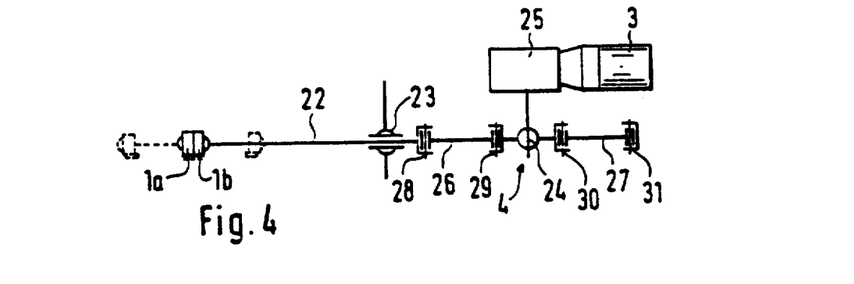
FIG. 4 is a side view of the arrangement shown in FIG. 3.

FIGS. 3 and 4 each illustrate in detail the inventive design of the drive of the cross-welding jaws 1. One of the cross-welding jaws 1a is, in the front view shown in FIG. 3, provided with a frame 20, which, guided by bearings 21, is transversely movable. The open state of the cross-welding jaw 1a is shown in full lines in FIG. 3, while the closed state of the cross-welding jaw 1a and of the frame 20 is shown in dashed lines. The other cross-welding jaw 1b is connected to an operating rod 22, which is guided laterally movably in a bearing 23. The full lines again show an open state, while the closed state of the cross-welding jaw 1b is shown in dashed lines.

Both the frame 20 and also the operating rod 22 are connected to a drive mechanism 4, which, in the illustrated exemplary embodiment, is constructed in the form of a toggle-lever mechanism. Said toggle-lever mechanism can be operated in reverse as illustrated by the arrows. Thus it is possible by rotating the shaft 24 to laterally move the operating rod 22 and the frame 20 in order to move the cross-welding jaws 1a, 1b toward one another or to separate same.

FIG. 4 illustrates a side view of the arrangement of FIG. 3. The cross-welding jaws 1a and 1b are here, in contrast to FIG. 3, in a closed state. In order to assure a clear illustration, FIG. 4 does not show either the frame 20 or its bearing 21.

The shaft 24 is rotated through a gearing 25 by the drive motor 3. FIG. 4 schematically illustrates the levers 26, 27 of the toggle-lever mechanism 4, which levers are each connected with one another or to the frame and the operating rod 22 and the shaft 24 through joints 28 to 31.

The invention makes it furthermore possible to provide above the cross-welding jaw 1 (according to the illustration of FIG. 5) additional squeezing-off elements, which can be moved toward one another and which are used to squeeze the cover-like tube to prevent a falling through or exiting of the material to be filled into the tube, while the cross-welding jaws are in the preheating or rather reheating position.

Figure 6:
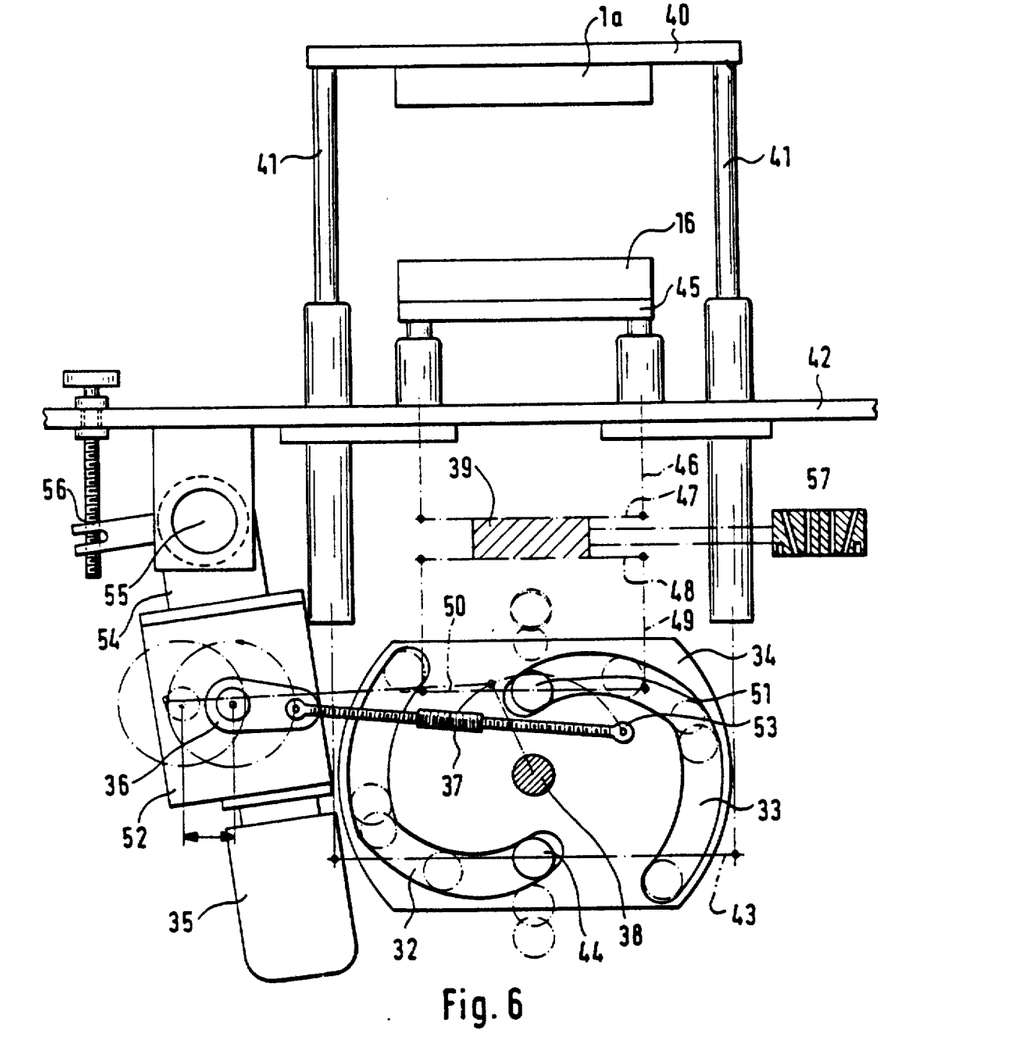
FIG. 6 is a schematized view of a further exemplary embodiment of an inventive drive mechanism for the welding jaws.

FIG. 6 schematically illustrates a further exemplary embodiment of the drive mechanism of the cross-welding jaws of the inventive tubular bagging machine. The cross-welding jaw 1a is fastened to a crossbar 40 connected to guideways 41, which are movably supported on a frame 42. The free ends of the guideways 41 are connected through a cross carrier 43, on which a cam 44 is supported, which can be constructed, for example, like a ball end. The cross-welding jaw 1b is supported on a crossbar 45 in a similar manner. The crossbar 45 is connected to guideways 46, which are also movably supported on the frame 42. The guideways 46 are connected at their free ends through a cross carrier 47. Said cross carrier 47 in turn is connected in its center area to a spring element 39, which can be constructed, for example, like a hydraulic, mechanical or air spring. A cross carrier 48 opposite the cross carrier 47 is fastened on the spring element, which cross carrier 48 is connected to two guideways 49, the free ends of which are connected to a cross carrier 50. Said cross carrier 50 has a cam 51 in its center area, which cam 51 can also be constructed like a ball end.

The apparatus further includes a support plate 34, on which two cam plates 32, 33 are constructed. The cam 51 can be moved on the cam plate 33, while the cam 44 is guided on the cam plate 32. The support plate 34 is reversibly pivotal about a swivel axis 38. As shown in FIG. 6, a pivoting of the support plate 34 results in a movement of the cams 44 and 51 along the cam plates 32 and 33 and thus in a back and forth movement of the cross-welding jaws 1a and 1b.

A pivoting of the support plate 34 is caused by a drive motor 35, which is connected to a gearing 52. A crank disk 36 is flanged to the output shaft of said gearing 52 and is pivotally connected to a rod 37, which is adjustable in length and is pivotally supported on the support plate 34 at reference numeral 53. Thus a back and forth movement of the support plate 34 is caused upon a rotation of the crank disk 36.

The drive motor 35 is supported on the frame 42 by means of a support plate 54 such, that a pivoting about a swivel axis 55 is possible. The pivoting of the drive motor 35 about the swivel axis 55 is done in the illustrated exemplary embodiment by means of a manually operable adjusting mechanism 56. However, it is also possible to provide an electric or hydraulic servo drive. By pivoting the drive motor 35, it is possible, as shown in FIG. 6, to change the movement of the support plate 34 around the stationary swivel axis 38 in order to change the sealing time or the closing time of the cross-welding jaws 1a, 1b, just like this is also possible through a change in the length of the rod 37.

The spring element 39 is, as schematically illustrated in FIG. 6, operatively connected to a multi-way valve 57 and can, for example when constructed as an air spring, be loaded with air pressure corresponding with the respective requirements in order to maintain or reduce the contact pressure of the cross-welding jaw 1b in this manner.

FIG. 6 shows the individual pivoting stages of the support plate 34 and the positions of the cams 51 and 44 in dependency of the respective pivot.

The invention is not limited to the illustrated exemplary embodiment, rather many possibilities for changes and modifications exist within the scope of the invention for the man skilled in the art.

We claim:

1. A method for controlling the movement of cross-welding jaws which create a sealed welding seam in tubular bags produced by a tubular bagging machine, wherein the control occurs in dependency on a contact pressure which said cross-welding jaws exert on said tubular bag during creation of said welding seam, a temperature of at least one of said cross-welding jaws and said tubular bag during creation of said welding seam, and a required sealing time during which said welding seam is created, including the steps of:
determining actual values of said contact pressure and said temperature; and
effecting a variance of at least one of said contact pressure, said tubular bag temperature, and said sealing time in response to said actual values of contact pressure and temperature, including moving said cross-sealing jaws through a sequence of movements while closely adjacent said tubular bag.

2. The method according to claim 1, wherein the temperature of the cross-welding jaws is determined and fed to a control mechanism.

3. The method according to claim 2, wherein the temperature of the bag material in the area of the cross-welding jaws is determined and is fed to the control mechanism.

4. The method according to claim 1, wherein the contact pressure is determined in dependency on the power input of a drive of the cross-welding jaws.

5. The method according to claim 2, wherein the path of movement of the cross-welding jaws is determined from an angular variation of a drive mechanism of the cross-welding jaws and is fed to the control mechanism.

6. The method according to claim 1, wherein said sequence of movements of said cross-welding jaws includes a first operating step, during which the cross-welding jaws are moved away from one another, a subsequent second operating step, during which the cross-welding jaws are moved toward one another and are placed against the tubular bag to be welded, a subsequent third operating step, during which the cross-welding jaws are pressed against one another, and a fourth operating step, during which the cross-welding jaws are separated from one another.

7. The method according to claim 6 wherein the cross-welding jaws are in the second operating step moved toward one another depending on the thickness of the material of the tubular bag.

8. The method according to claim 6, wherein the cross-welding jaws are prior to or at the start of the second operating step kept at a distance for the surface of the tubular bag in order to heat up the tubular bag.

9. The method according to claim 6, wherein the cross-welding jaws, prior to the fourth operating step, are held at a small distance from one another in order to reheat the welding area.

10. The method according to claim 1, wherein the method can be carried out several times successively.

11. A tubular bagging machine, comprising a forming shoulder and a welding mechanism to construct a foil tube, and cross-welding jaws arranged thereafter, which cross-welding jaws are movable laterally with respect to the foil tube, a rotatable drive for moving said cross-welding jaws into engagement with the foil tube and compressing the foil tube to form a welded seam, a control mechanism for operating and controlling said drive, a drive mechanism drivingly connected between said drive and said cross-welding jaws and including a toggle-lever arrangement, and a sensor adjacent said drive for detecting a torque transmitted from said drive to said drive mechanism for purposes of determining a contact pressure exerted on the foil tube by said cross-welding jaws.

12. The tubular bagging machine according to claim 11, wherein squeezing elements for squeezing the foil tube above said cross-welding jaws are arranged in front of said cross-welding jaws.

13. The tubular bagging machine according to claim 11, wherein said drive mechanism includes a ball-roller spindle for advancing said toggle-lever arrangement.

14. The tubular bagging machine according to claim 11, wherein said drive mechanism includes reversibly movable cam plates for operating said toggle-lever arrangement.

15. The tubular bagging machine according to claim 11, wherein said drive mechanism includes a hydraulic cylinder for operating said toggle-lever arrangement.

16. The tubular bagging machine according to claim 11, wherein said drive mechanism includes a linear drive for operating said toggle-lever arrangement.

17. The tubular bagging machine according to claim 11, wherein said drive mechanism includes a cam plate for each cross-welding jaw, in which cam plate is guided a cam connected to the associated said cross-welding jaw, and wherein said cam plates are constructed on a support plate which is reversibly pivotal.

18. The tubular bagging machine according to claim 17, wherein said drive mechanism includes a crank gear for pivoting said support plate.

19. The tubular bagging machine according to claim 18, wherein said drive includes a drive motor, to which a crank disk is connected by said crank gear, which crank disk is operatively connected with said support plate through a rod.

20. The tubular bagging machine according to claim 19, wherein said rod is adjustable in length to adjust the closing of said cross-welding jaws and the sealing time.

21. The tubular bagging machine according to claim 19, wherein said drive motor is pivotally supported to adjust the closing of said cross-welding jaws and the sealing time.

22. The tubular bagging machine according to claim 21, including means for effecting pivotal movement of said drive motor, said pivotal movement means including one of a manual adjustment mechanism and a servo drive.

23. The tubular bagging machine according to claim 19, wherein said drive motor includes means for permitting regulation of an operating speed thereof to adjust the closing of said cross-welding jaws and the sealing time.

24. The tubular bagging machine according to claim 17, wherein said cam plates of said support plate are constructed substantially point-symmetrically in relationship to a swivel axis of said support plate.

25. The tubular bagging machine according to claim 17, wherein said cam plates of said support plate are constructed differently to each produce a different movement of said cross-welding jaws.

26. The tubular bagging machine according to claim 25, wherein said cam plate of a first said cross-welding jaw has a closing area and a sealing area following thereafter and not including any closing, and said cam plate of a second said cross-welding jaw has a closing area, an area with little closing following thereafter and a following sealing area not including any closing.

27. The tubular bagging machine according to claim 11, wherein between at least one of said cross-welding jaws and said drive mechanism there is arranged an adjustable spring element.

28. The tubular bagging machine according to claim 27, wherein said spring element is a spring mechanism loadable with air pressure.

29. The tubular bagging machine according to claim 28, wherein said spring mechanism includes means for adjusting the pressure thereof independently from the operation of said drive mechanism.

30. The tubular bagging machine according to claim 28, wherein said spring mechanism includes a sensor for monitoring the air pressure, which sensor is operatively connected to said control mechanism.

31. The tubular bagging machine according to claim 11, wherein a sensor for determining a path of movement of said cross-welding jaws is arranged adjacent said toggle-lever arrangement.

* * * * *

UNITED STATES PATENT AND TRADEMARK OFFICE
CERTIFICATE OF CORRECTION

PATENT NO. : 5 117 612
DATED : June 2, 1992
INVENTOR(S) : Dieter KEIM et al.

It is certified that error appears in the above-identified patent and that said Letters Patent is hereby corrected as shown below:

On the title page, Item [75] the inventors' names and addresses should appear as follows:

Dieter Keim, Langgöns;

Bernd Stein, Reiskirchen;

Walter Baur, Grundau;
Werner Schneider, Hohenahr;
Reiner Ade, Muensing; and
Michael Kabot, Langgöns;
all of the Federal Republic of Germany Signed and Sealed this Fifth Day of October, 1993

*Attest:*

BRUCE LEHMAN

*Attesting Officer*      Commissioner of Patents and Trademarks

UNITED STATES PATENT AND TRADEMARK OFFICE
CERTIFICATE OF CORRECTION

PATENT NO. : 5 117 612
DATED : June 2, 1992
INVENTOR(S) : Dieter KEIM et al.

It is certified that error appears in the above-identified patent and that said Letters Patent is hereby corrected as shown below:

On the title page, Item [75], the inventors' names and addresses should appear as follows:

Dieter Keim, Langgöns;
Bernd Stein, Reiskirchen;
Walter Baur, Gründau;
Werner Schneider, Hohenahr;

Reiner Ade, Muensing; and
Michael Kabot, Langgöns;
all of the Federal Republic of Germany This certificate supersedes Certificate of Correction issued October 5, 1993

Signed and Sealed this

Eighteenth Day of January, 1994

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,117,612
DATED : June 2, 1992
INVENTOR(S) : Dieter Keim, et al

It is certified that error appears in the above-indentified patent and that said Letters Patent is hereby corrected as shown below:

On the title page, Item [75], the inventors' names and addresses should appear as follows:
  Dieter Keim, Langgöns;
  Bernd Stein, Reiskirchen;
  Walter Baur, Gründau;
  Werner Schneider, Hohenahr;
  Herbert Lohr, Reiskirchen;
  Reiner Ade, Muensing; and
  Michael Kabot, Langgöns;
  all of the Federal Republic of Germany This certificate supersedes Certificate of Correction issued January 18, 1994.

Signed and Sealed this

Twelfth Day of April, 1994

Attest:

BRUCE LEHMAN

*Attesting Officer*    *Commissioner of Patents and Trademarks*